US011611506B2

(12) United States Patent
Goud Gadela et al.

(10) Patent No.: US 11,611,506 B2
(45) Date of Patent: Mar. 21, 2023

(54) PROCESSING A FLOW AT THE EGRESS NODE IN SEGMENT ROUTING

(71) Applicant: Juniper Networks, Inc., Sunnyvale, CA (US)

(72) Inventors: Sri Karthik Goud Gadela, Cupertino, CA (US); Swamy Sadashivaiah Renu Kananda, Sunnyvale, CA (US); Ronald P. Bonica, Sterling, VA (US); Shraddha Hegde, Bangalore (IN); Srihari Ramachandra Sangli, Bengaluru (IN); Rajesh Shetty Manur, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/949,037

(22) Filed: Oct. 9, 2020

(65) Prior Publication Data

US 2022/0116317 A1 Apr. 14, 2022

(51) Int. Cl.
*G06F 15/16* (2006.01)
*H04L 45/00* (2022.01)
(Continued)

(52) U.S. Cl.
CPC .............. *H04L 45/38* (2013.01); *H04L 45/12* (2013.01); *H04L 45/52* (2013.01); *H04L 45/74* (2013.01); *H04L 69/22* (2013.01)

(58) Field of Classification Search
CPC ......... H04L 45/38; H04L 45/12; H04L 45/52; H04L 45/74; H04L 69/22; H04L 45/13; H04L 69/04
See application file for complete search history.

(56) References Cited

U.S. PATENT DOCUMENTS 10,491,525 B2 11/2019 Li et al.
2014/0369356 A1* 12/2014 Bryant .................... H04L 45/04 370/392

(Continued)

FOREIGN PATENT DOCUMENTS

CN 102421162 A 4/2012
CN 105471927 A 4/2016

(Continued)

OTHER PUBLICATIONS

Bonica, "IPv6 Support for Segment Routing: SRv6+", 2019 (Year: 2019).*

(Continued)

*Primary Examiner* — Oscar A Louie
*Assistant Examiner* — Messeret F Gebre
(74) *Attorney, Agent, or Firm* — Shumaker & Sieffert, P.A.

(57) ABSTRACT

This disclosure describes techniques that include determining, at an egress node in an SRm6 network, how to process a packet that may arrive without a segment routing header and/or a compressed routing header. In one example, this disclosure describes a method that includes receiving, by an egress node of a segment routing network, segment routing advertisements; configuring, by the egress node and based on the segment routing advertisements, information enabling the egress node to recognize encapsulated packets arriving at the egress node without a compressed routing header; receiving, by the egress node, a packet that does not have a compressed routing header; and de-encapsulating, by the egress node and based on the stored information, the packet.

20 Claims, 5 Drawing Sheets

(51) Int. Cl.

| | |
|---|---|
| ***H04L 45/12*** | (2022.01) |
| ***H04L 45/52*** | (2022.01) |
| ***H04L 45/74*** | (2022.01) |
| ***H04L 69/22*** | (2022.01) |

(56) References Cited

U.S. PATENT DOCUMENTS

| | | | | |
|---|---|---|---|---|
| 2019/0288940 | A1 | 9/2019 | Filsfils et al. | |
| 2020/0127913 | A1* | 4/2020 | Filsfils | H04L 45/52 |
| 2020/0274798 | A1* | 8/2020 | Filsfils | H04L 45/566 |
| 2020/0328971 | A1* | 10/2020 | Bashandy | H04L 45/14 |
| 2021/0083973 | A1 | 3/2021 | Peng et al. | |
| 2021/0328906 | A1 | 10/2021 | Peng et al. | |

FOREIGN PATENT DOCUMENTS

| | | | |
|---|---|---|---|
| CN | 107171959 | A | 9/2017 |
| CN | 107409091 | A | 11/2017 |
| CN | 107566272 | A | 1/2018 |
| CN | 110557329 | A | 12/2019 |
| CN | 110830352 | A | 2/2020 |

OTHER PUBLICATIONS

Alston "BGP Extensions for IPv6 Compressed Routing Header (CRH)ndraft-alston-spring-crh-bgp-signalling-01", Jul. 14, 2019 (Year: 2019).*

NetEngine "NetEngine 8000 F V800R012C00SPC300 Feature Description—Segment Routing 04", Jun. 17, 2020 (Year: 2020).*

M. Wadhwa and M. Khari, "Prevention Algorithm against the Vulnerability of Type 0 Routing Header in Ipv6," 2011 International Conference on Computational Intelligence and Communication Networks, 2011, pp. 616-620, doi: 10.1109/CICN.2011.133. (Year: 2011).*

Yi-Ran Du, Wei Li and Zi-Bin Dai, "Lightweight network-on-chip router on research and design," 2016 13th IEEE International Conference on Solid-State and Integrated Circuit Technology (ICSICT), 2016, pp. 232-234, doi: 10.1109/ICSICT.2016.7998885. (Year: 2016).*

B. Gurakan, O. Ozel and S. Ulukus, "Optimal Energy and Data Routing in Networks With Energy Cooperation," in IEEE Transactions on Wireless Communications, vol. 15, No. 2, pp. 857-870, Feb. 2016, doi: 10.1109/TWC.2015.2479626. (Year: 2015).*

Oran, "OSI IS-IS Intra-domain Routing Protocol," Network Working Group, RFC 1142, Feb. 1990, 217 pp.

Moy, "OSPF Version 2," Network Working Group, RFC 2328, Apr. 1998, 244 pp.

Li, "IS-IS Extensions for Traffic Engineering," Network Working Group, RFC 5305, Oct. 2008, 18 pp.

Coltun et al., "OSPF for IPv6," Network Working Group, RFC 5340, Jul. 2008, 95 pp.

Vasseur et al., "Path Computation Element (PCE) Communication Protocol (PCEP)," Network Working Group, RFC 5440, Mar. 2009, 88 pp.

Enns et al., "Network Configuration Protocol (NETCONF)," Internet Engineering Task Force (IETF), RFC 6241, Jun. 2011, 114 pp.

Sheth et al., "OSPF Hybrid Broadcast and Point-to-Multipoint Interface Type," Internet Engineering Task Force (IETF), RFC 6845, Jan. 2013, 10 pp.

Lindem et al., "OSPFv3 Link State Advertisement (LSA) Extensibility," Internet Engineering Task Force (IETF), RFC 8362, Apr. 2018, 34 pp.

Extended Search Report from counterpart European Application No. 20216114.7, dated May 27, 2021, 13 pp.

Bonica et al., "Segment Routing Mapped To IPv6 (SRm6); draft-bonica-spring-sr-mapped-six-02.txt," Spring Working Group, Internet-Draft, Oct. 4, 2020, 18 pp.

Kaneriya et al., "IS-IS Extensions To Support The IPv6 Compressed Routing Header (CRH); draft-bonica-lsr-crh-isis-extensions-03.txt," LSR Working Group, Internet-Draft, Aug. 30, 2020, 12 pp.

Bonica et al., "The IPv6 Tunnel Payload Forwarding (TPF) Option;draft-bonica-6man-vpn-dest-opt-13.txt," 6man, Internet-Draft, Aug. 30, 2020, 9 pp.

First Office Action and Search Report, and translation thereof, from counterpart Chinese Application No. 202011581785.8 dated Oct. 20, 2022, 20 pp.

Response to Extended Search Report dated May 27, 2021, from counterpart European Application No. 20216114.7 filed Oct. 12, 2022, 25 pp.

* cited by examiner

PROCESSING A FLOW AT THE EGRESS NODE IN SEGMENT ROUTING

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Segment routing, which may also be referred to as source packet routing or source packet routing in networking (SPRING), is a control-plane architecture that enables an ingress router to steer a packet through a specific set of nodes and links in a network without relying on intermediate nodes in the network to determine the path it should take. Segment routing can be instantiated over forwarding planes that include SR-MPLS (segment routing with multiprotocol label switching), SRv6 (segment routing over IPv6), and or SRm6 (segment routing mapped to IPv6, or sometimes referred to as SRv6+). In SR-MPLS, each segment is encoded as a member of an MPLS label stack. In SRv6, each segment is encoded by a member of a segment list in a segment routing header. In SRm6, each segment is encoded as a member of a segment list in a compressed routing header.

SUMMARY

This disclosure describes techniques that include determining, at an egress node in an SRm6 network, how to process a packet that may arrive without a routing header used for segment routing, and specifically, without a compressed routing header. In some situations, such as when a network is operating in SRm6 reduced mode, a packet may be constructed without either a segment routing header or a compressed segment routing header, and/or without information that identifies the number of segments left to process. This may occur in situations in which a routing path for the packet has only a single address or SID. Without a routing header that includes information used for segment routing, a node might have difficulty determining how to properly process the packet. Techniques described herein may enable a node to identify when a packet has reached its destination, even where a segment routing header or a compressed routing header is not present. Such techniques may involve storing information that enables a node to determine that it should perform a tunnel termination or otherwise act as an egress node for a packet.

In one example, a node may observe segment routing advertisements that occur in the network, and store, based on such advertisements, routing information that enables it to identify a packet for which it is to perform a tunnel termination. In another example, a node may, based on such advertisements, configure a filter that identifies packets that have reached their destination, and for matching packets, perform actions consistent with the node acting as an egress node.

In some examples, this disclosure describes operations performed by a network router or other network device in accordance with one or more aspects of this disclosure. In one specific example, this disclosure describes a method comprising receiving, by an egress node of a segment routing network, segment routing advertisements; configuring, by the egress node and based on the segment routing advertisements, information enabling the egress node to recognize encapsulated packets arriving at the egress node without a routing header used for segment routing; receiving, by the egress node, a packet that does not have a routing header used for segment routing; and de-encapsulating, by the egress node and based on the stored information, the packet.

In another example, this disclosure describes a system comprising a storage system; and processing circuitry in a node within a segment routing network, wherein the processing circuitry has access to the storage device and is configured to: receive segment routing advertisements, configure, based on the segment routing advertisements, information enabling the node to recognize encapsulated packets arriving at the node without a routing header used for segment routing, receive a packet that does not have a routing header used for segment routing, and de-encapsulate, based on the stored information, the packet.

In another example, this disclosure describes a computer-readable storage medium comprising instructions that, when executed, configure processing circuitry of a computing system to receive segment routing advertisements; configure, based on the segment routing advertisements, information enabling a node to recognize encapsulated packets arriving at the node without a routing header; receive a packet that does not have a routing header; and de-encapsulate, based on the stored information, the packet.

DETAILED DESCRIPTION

Figure 1A:
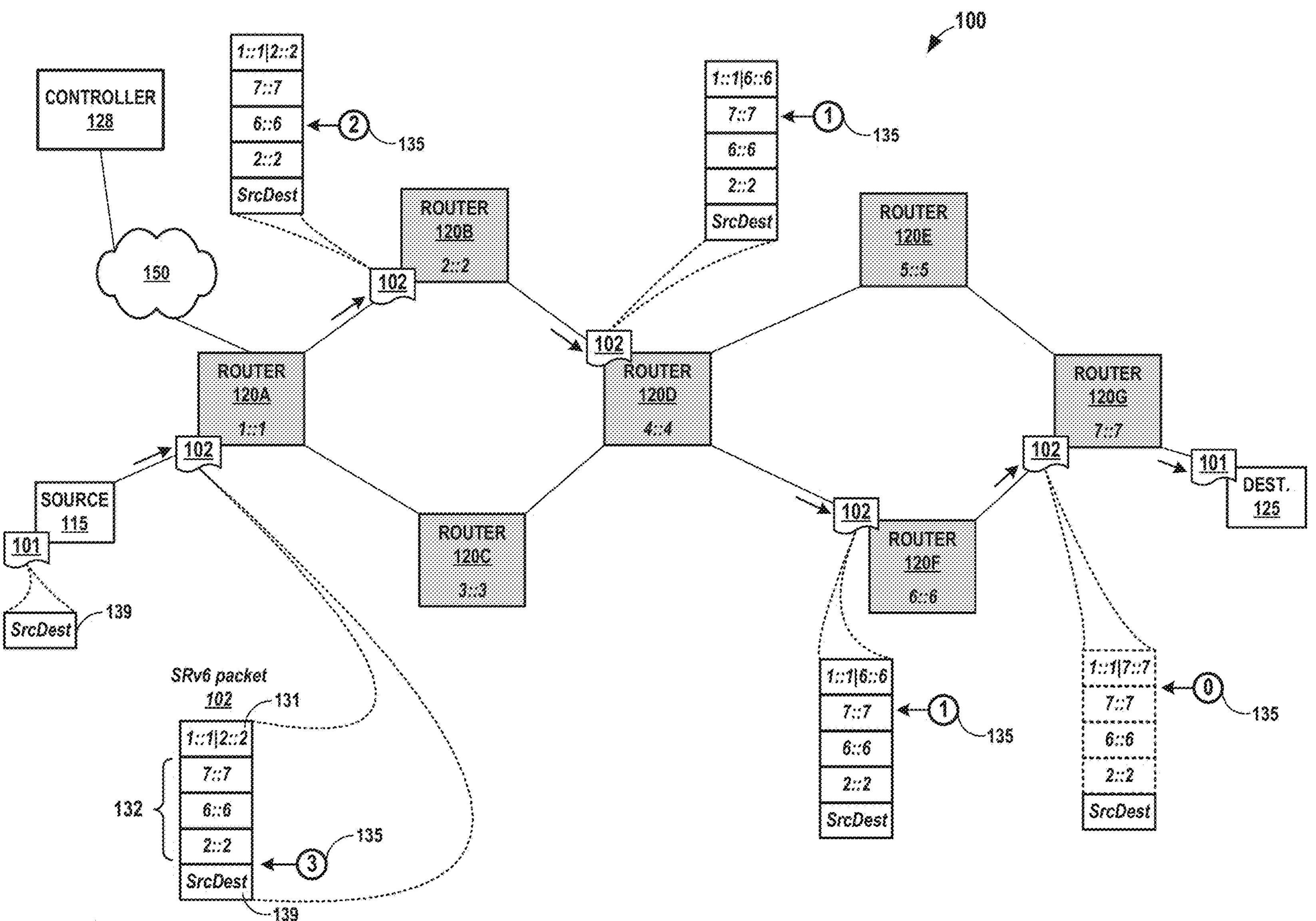
FIG. 1A is a block diagram illustrating an example network in which packets are routed using SRv6 (segment routing over IPv6) in accordance with one or more aspects of the present disclosure.

FIG. 1A is a block diagram illustrating an example network in which packets are routed using SRv6 (segment routing mapped to IPv6) in accordance with one or more aspects of the present disclosure. FIG. 1A illustrates network 100, in which source 115 sends a packet (e.g., packet 101) over a network to destination 125. To reach its destination, packet 101 is routed over network 100 by a series of nodes or routers. Included within network 100 are nodes 120A, 120B, 120C, 120D, 120E, 120F, and 120G ("nodes 120" or "routers 120"). As illustrated in FIG. 1A, network 100 also includes controller 128, which may communicate with one or more of nodes 120 over network 150. In some examples, controller 128 may be capable of receiving input from an operator or administrator (not shown) to, for example, configure aspects of network 100.

In the example shown in FIG. 1A, each of nodes 120 are capable of performing routing operations. In addition, node 120A, node 120B, node 120F, and node 120G are SRv6-aware nodes or routers, capable of routing packets pursuant to SRv6 processes. Other nodes 120 (e.g., node 120D) might not be SRv6-aware nodes, although such nodes may be capable of routing packets pursuant to IPv6. In an SRv6 network, when an ingress node (e.g., node 120A) receives packet 101 from source 115, node 120A creates an SRv6 packet, illustrated in FIG. 1A as SRv6 packet 102. To create SRv6 packet 102, node 120A encapsulates packet 101 (and/or payload 139 received from source 115) by adding IPv6 header 131 and segment routing header 132, as well as a counter field or a "segments left" field 135.

Packet 102 thus includes IPv6 header 131, segment routing header 132, segments left field 135, and payload 139 in the form shown in FIG. 1A. Payload 139 is the payload included within packet 101 received from source 115, and is encapsulated by packet 102. IPv6 header 131 is a header that specifies the source and destination addresses of the packet, as well as the protocol associated with the packet. The source and destination addresses included within packet 102 are represented by the text "1::1|2::2," which indicates that the source address is "1::1" and the destination address is "2::2" for packet 102 at node 120A.

Segment routing header 132 is a list of addresses, each corresponding to one of nodes 120 that are to be visited by packet 102 along the desired or chosen path to destination 125. Specifically, packet 102 includes a list of three addresses (7::7, 6::6, and 2::2). As illustrated in FIG. 1A, address 2::2 corresponds to node 120B, address 6::6 corresponds to node 120F, and address 7::7 corresponds to node 120G. Accordingly, and as illustrated in FIG. 1A, packet 102 is to be routed from node 120A to node 120B, then to node 120F (e.g., through node 120D), and then to node 120G.

Segments left field 135 is a count of the number of segments left to be traversed in the SRv6 route. At ingress in FIG. 1A, segments left field 135 has a value of 3, indicating that all three segments are left to be traversed. Segments left field 135 may, in some examples, serve as a pointer to the next segment to be used as a path.

In the example of FIG. 1A, nodes 120 may route packets over nodes 120. For instance, in an example that can be described with reference to FIG. 1A, node 120A receives packet 101 from source 115 and encapsulates packet 101 as packet 102, as described above. When encapsulating packet 101, node 120A copies the first address ("2::2") in segment routing header 132 to the destination address field within IPv6 header 131 of packet 102, so that the source/destination address pair for packet 102 at node 120A is "1::1|2::2" as illustrated in FIG. 1A. Node 120A then routes packet 102 to node 120B, which has an address of 2::2. Node 120A also decrements segments left field 135 so that segments left field 135 has a value of "2" when it arrives at node 120B.

When node 120B receives packet 102, node 120B determines that segments left field 135 is not zero, so node 120B concludes that packet 102 has not yet reached its destination. Node 120B copies the next address in segment routing header 132 ("6::6") to the destination address field within IPv6 header 131 of packet 102. Node 120B routes packet 102 to node 120F, which has an address of 6::6. Before packet 102 leaves node 120B, node 120B also decrements segments left field 135 so that segments left field 135 has a value of "1" when it arrives at node 120F. In some examples, there might not be a direct or single-hop path between node 120B and node 120F, so when routing packet 102 to node 120F, node 120B may choose a least-cost path to node 120F. As shown in FIG. 1A, node 120B routes packet 102 to node 120D (which might not be an SRv6-aware node), and then node 120D routes packet 102 to node 120F.

When node 120F receives packet 102, node 120F determines that segments left field 135 is still not zero, so node 120F concludes that packet 102 has not yet reached its destination. Node 120F copies the last address ("7::7") from segment routing header 132 to the destination address field within 131 of packet 102. Node 120F decrements segments left field 135 so that segments left field 135 has a value of 0 when packet 102 arrives at node 120G. Node 120F routes packet 102 to node 120G, which has an address of 7::7.

Node 120G receives packet 102 from node 120F and determines that it is the egress node, since segments left field 135 is zero. Node 120G thus serves as the egress node, decapsulating packet 102 to re-expose packet 101 and/or payload 139 (see the dotted lines illustrating decapsulated portions of packet 102 at node 120G). Node 120G may then route packet 101 to destination 125 as shown in FIG. 1A.

Figure 1B:
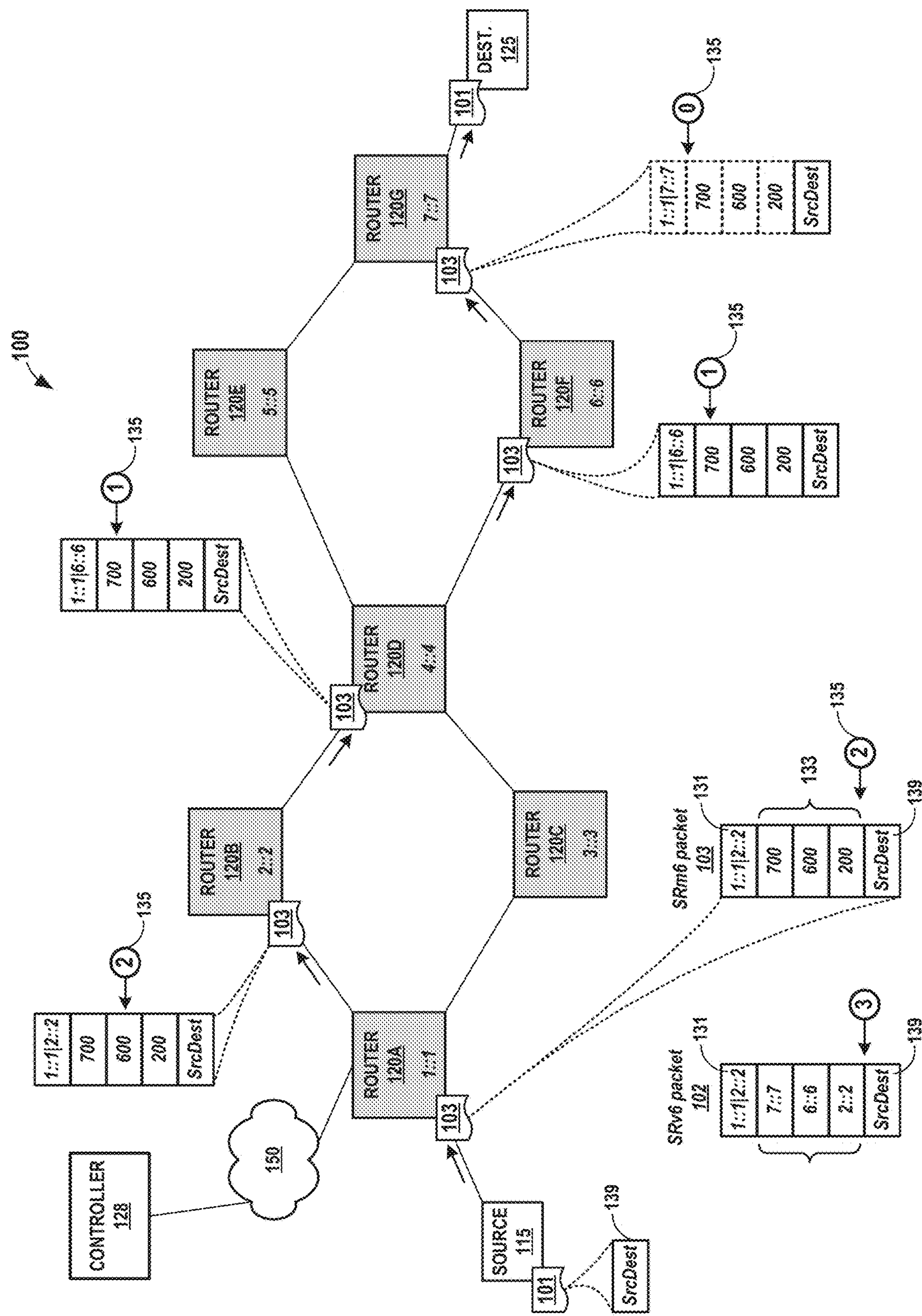
FIG. 1B is a block diagram illustrating an example network in which packets are routed using SRm6 (segment routing mapped to IPv6) in accordance with one or more aspects of the present disclosure.

FIG. 1B is a block diagram illustrating an example network in which packets are routed using SRm6 (segment routing mapping to IPv6) in accordance with one or more aspects of the present disclosure. FIG. 1B is similar to FIG. 1A, except that packets are routed using SRm6, rather than (or in addition to) SRv6. In FIG. 1B, node 120A, node 120B, and node 120F are SRm6-aware nodes, capable of routing packets pursuant to SRm6. Other illustrated nodes 120 might not be SRm6-aware nodes, but such nodes are capable of routing packets pursuant to IPv6.

SRm6 and SRv6 are similar, but one difference between SRm6 and SRv6 involves the structure of the packet. When node 120A receives packet 101 from source 115, node 120A of FIG. 1B creates an SRm6 packet, illustrated as packet 103 in FIG. 1B. Packet 103 has a structure similar to packet 102 (packet 102 is reproduced in FIG. 1B for comparison), and includes IPv6 header 131 and payload 139. However, packet 103 does not include segment routing header 132, and instead, packet 103 includes compressed routing header 133. Both segment routing header 132 and compressed routing header 133 may be considered routing headers used for segment routing. Segment routing header 132 of packet 102 is a list of addresses, which may each be 16 bytes in length. Compressed routing header 133 of packet 103, on the other hand, is a list of integers or segment identifiers ("SIDs"). These integers or SIDs tend to be significantly shorter than 16 bytes in length. Compressed routing header 133 thus tends to be a significantly smaller size than segment routing header 132, and this is one advantage of SRm6 over SRv6.

When encapsulating packet 101 in the SRm6 context, node 120A determines—just as in SRv6—a list of addresses along the desired path for packet 103 within network 100. However, rather than using the addresses to create compressed routing header 133, node 120A maps each of these addresses to an integer or SID in a table. These SIDs are used to create compressed routing header 133 that is part of packet 103. Information about this table is made available to and/or stored at each of nodes 120 (or at least available to each of the SRm6-aware nodes 120) within network 100. In some examples, controller 128 may configure each of SRm6-aware nodes 120 with such information, or may play a role in establishing such configuration.

To route SRm6 packet 103, nodes 120 may perform operations similar to those described in FIG. 1A. For instance, in an example that can be described with reference to FIG. 1B, node 120A receives packet 101 and encapsulates packet 101 as packet 103, as described above. Node 120A then routes packet 103 to node 120B based on the destination address in IPv6 header 131 of packet 103, which is 2::2. Node 120A also decrements segments left field 135 of packet 103 so that segments left field 135 has a value of "2" when it arrives at node 120B.

When node 120B receives packet 103 in FIG. 1B, node 120B determines that segments left field 135 is not zero, so node 120B concludes that packet 103 has not yet reached its destination. Node 120B uses segments left field 135 in compressed routing header 133 to determine that 600 is the value associated with the next segment. Node 120B performs a lookup in a mapping table (using "600" as the index value) to identify an address, which it determines to be 6::6. Node 120B copies this address ("6::6") to the destination address field within IPv6 header 131 of packet 103. Node 120B routes packet 103 to node 120F, which has an address of 6::6 (packet 103 is routed through node 120D on its way to node 120F, as in FIG. 1A). Node 120B decrements segments left field 135 so that segments left field 135 of packet 103 has a value of "1" when it arrives at node 120F.

When node 120F receives packet 103, node 120F determines that segments left field 135 is not zero, so node 120F performs a lookup in an address mapping table (using "700" as the index value) to identify 7:::7 as the next address along the SRm6 path. Node 120F copies this 7::7 address to the destination address field within 131 of packet 103. Node 120F routes packet 103 to node 120G, and also decrements segments left field 135 so that segments left field 135 has a value of 0 when packet 103 arrives at node 120G. Node 120G receives packet 103 from node 120F and determines that it is the egress node, since segments left field 135 is zero. Node 120G decapsulates packet 103, and routes packet 101 to destination 125, as shown in FIG. 1B.

Figure 1C:
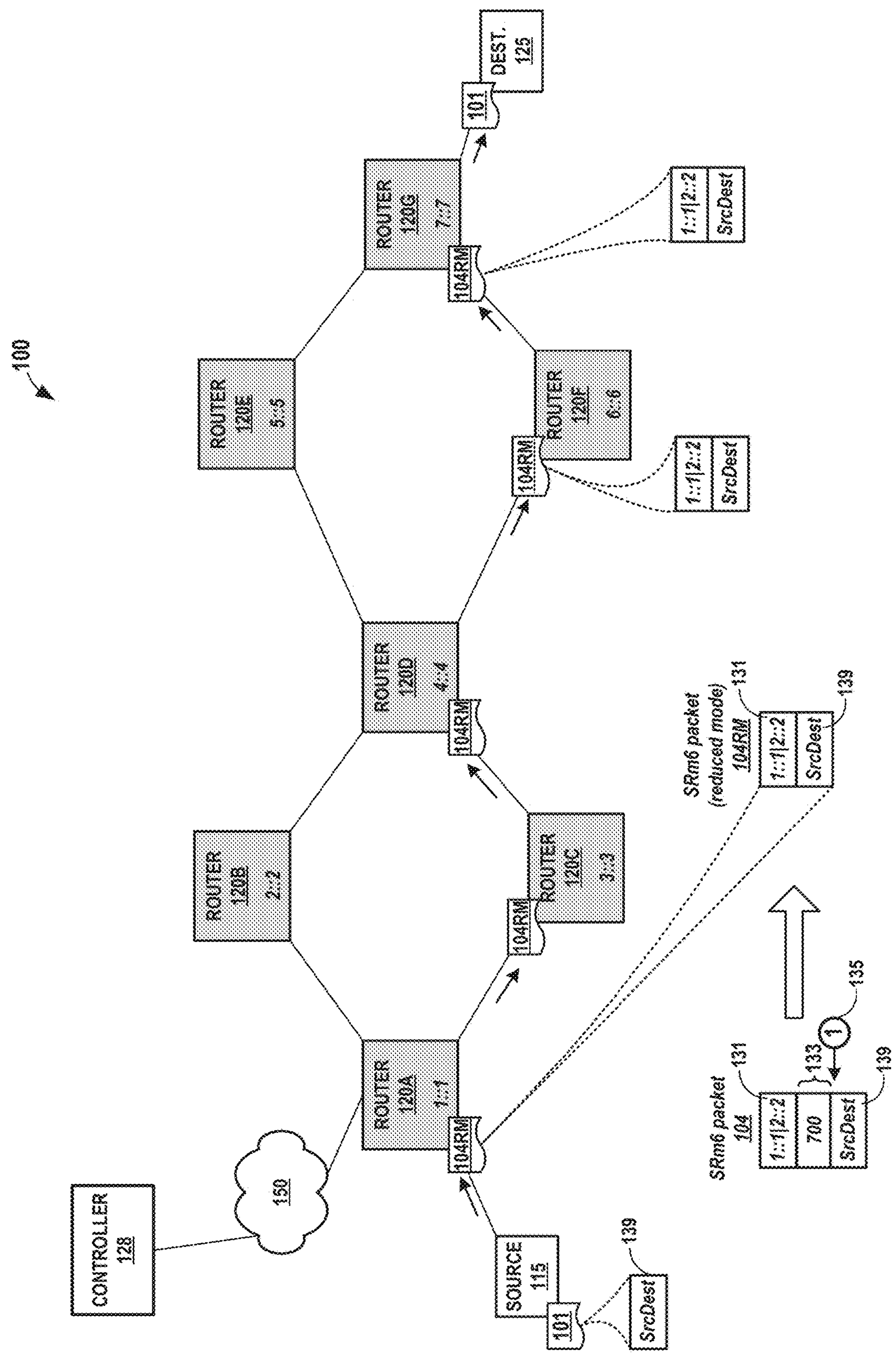
FIG. 1C is a block diagram illustrating an example network in which packets are routed in a reduced mode using SRm6 (segment routing mapped to IPv6) in accordance with one or more aspects of the present disclosure.

FIG. 1C is a block diagram illustrating an example network in which packets are routed in a reduced mode using SRm6 (segment routing mapped to IPv6) in accordance with one or more aspects of the present disclosure. In FIG. 1C, node 120A receives packet 101 from source 115 and encapsulates packet 101 as packet 104. FIG. 1C is similar to FIG. 1B, except that in FIG. 1C, when node 120A encapsulates packet 101 to create SRm6 packet 104, the policy implemented at node 120A in FIG. 1C only requires that packet 104 visit node 120G on the path to destination 125. Thus, packet 104 (see in FIG. 1C) differs from packet 103 in FIG. 1B in that only one SID is included within compressed routing header 133 of packet 103 (as illustrated in FIG. 1C, that one SID in packet 104 is 700, corresponding to address 7::7), whereas in FIG. 1B, three SIDs are included within compressed routing header 133 of packet 103 (as illustrated in FIG. 1B, the SIDs are 700, 600, 200).

Routing SRm6 packet 104 in FIG. 1C, if a compressed routing header 133 were to be included within packet 104, would be performed in a manner similar to how SRm6 packet 103 is routed in FIG. 1B. Effectively, node 120A receives packet 101 from source 115, and node 120A creates packet 104 as shown in FIG. 1C. Node 120A would then use the single SID (700) in compressed routing header 133 as an index to look up an address. Node 120A would identify 7::7 (corresponding to node 120G) as the address associated with 700 and route packet 104 to node 120G, likely using a least-cost path between node 120A and node 120G. Before packet 104 leaves node 120A, node 120A would also decrement segments left field 135 so that segments left field 135 is zero when it arrives at node 120G. When node 120G receives packet 104, node 120G is able to determine that it is the egress node, since segments left field 135 is zero.

However, FIG. 1C illustrates routing of packet 104RM, as described below. Both SRv6 and SRm6 have more than one mode, including a "regular mode" and a "reduced mode." When operating in reduced mode, an SRm6 packet that is created with only a single SID within compressed routing header 133 may omit compressed routing header 133 (and segments left field 135) from packet 104. In such an example, packet 104 of FIG. 1C has the form of packet 104RM as shown in FIG. 1C. In the example shown, packet 104RM omits compressed routing header 133 and segments left field 135, and might include only IPv6 header 131 and payload 139.

Routing SRm6 packet 104RM can be performed in a manner similar to how packet 104 is routed in FIG. 1C, but the lack of compressed routing header 133 may have an effect on the egress node's ability to determine that it is the egress node. For instance, in an example that can be described in connection with FIG. 1C, node 120A receives packet 101 and encapsulates packet 101 as packet 104RM, as described above. Node 120A then routes packet 104RM to node 120G, likely using a least-cost path between node 120A and node 120G. Note that in the example of FIG. 1C, packet 104 follows a different path than packet 102 of FIG. 1A or packet 103 of FIG. 1B. When node 120G receives packet 104RM, node 120G might be unable to determine whether packet 104RM is an SRm6 packet or a regular IPv6 packet, since packet 104RM does not include compressed routing header 133. Further, node 120G cannot determine whether it is to serve as an egress node, since there is no segments left field 135 included within packet 104RM, and node 120G is therefore not able to determine whether the value of segments left field 135 is zero. Accordingly, when routing an SRm6 packet in reduced mode where the engineered traffic path has a length of one, the egress node may have difficulty determining whether it is the egress node. In some examples, an egress node cannot determine how to dispose of packet 104RM when it arrives and/or whether to do a tunnel termination. Although this issue could possibly arise with both SRv6 and SRm6 networks, the issue may be particularly applicable to SRm6 networks. In SRv6, processing starts with IPv6 addresses, but in SRm6, the addresses can be just local interface addresses, making it difficult for node 120G to determine whether it is processing a regular IPv6 packet or an SRm6 packet.

One way to address this difficulty in identifying packet 104RM as an SRm6 packet and/or the difficulty of receiver nodes determining whether to operate as an egress node, is for some or all of the nodes in a network (e.g., node 120G) to observe communications (e.g., advertisements or information exchanges pertaining to ISIS adjacencies) among SRm6-aware nodes (i.e., nodes 120A, 120B, 120F, and 120G in the examples of FIG. 1A to FIG. 1C) and install a route to indicate situations in which each such node is to act as an egress node. For example, node 120G may receive information, through ISIS adjacency communications amongst the SRm6-aware nodes in network 100, about the SIDs associated with various routes. Based on this information, node 120G is aware of which other nodes 120 are SRm6-aware nodes in network 100. Node 120G may, based on such communications, install a long route (e.g., from node 120A to node 120G, or specifically, from 1::1 to 7::7). In some examples, two such long routes may be installed for nodes 120A and 120G: one from 1::1 to 7::7 that specifies an IPIP (IP within IP encapsulation) protocol, and the other from 1::1 to 7::7 that specifies an IPIPv6 (IP within IPv6 encapsulation) protocol. This installed long route may point to a decapsulation next hop.

In the example being described in connection with FIG. 1C, when packet 104RM arrives at node 120G, node 120G will be able to determine, even if packet 104RM does not include segments left field 135 (or compressed routing header 133), that it is an egress node. Node 120G makes such a determination based the source address being 1::1, the destination being 7::7, and the protocol being IPIP or IPIPv6 (thus matching the installed long route). Node 120G may therefore decapsulate packet 104RM and route packet 101 to destination 125.

The above-described solution addresses the problem of identifying packet 104RM at egress. Accordingly, the above-described technique may be appropriate for some networks which implement SRm6 reduced mode. However, in some examples, where there are a large number of SRm6 nodes within network 100, the amount of information that may be stored on each of nodes 120 to implement this solution (e.g., stored long routes) may be significant. Consumption of such storage space and additional processing that may be required for a large amount of information therefore might, in some respects, be a disadvantage of this solution.

An alternative solution may involve installing filter-based decapsulation logic on egress nodes, such as node 120G. On one or more of such egress nodes, the control plane may install a filter that may be attached to the default instance. Such a filter may be implemented through code having the form:

```
term t1 {
destination-address
protocol
} action {
decapsulate
accept
}
```

When the above-described filter is installed on node 120G, the filter would evaluate each packet received by node 120G, and determine if the destination address matches its own IPv6 address (e.g., address 7::7 for node 120G) and either the IPIP or IPIPv6 protocol. Applying the above filter code, if the destination address and protocol match, then node 120G performs the specified actions. In the above code, these actions (specified in the "action" block) include "decapsulate" (i.e., node 120G should decapsulate the packet to expose packet 101 within packet 104), and "accept" (e.g., node 120G should continue processing the packet, rather than dropping the packet). Accordingly, the installed filter enables node 120G to determine whether it is to act as an egress node, even where no compressed routing header 133 or segments left field 135 is present within packet 104. The effect of such a filter in FIG. 1C is that node 120G is able to decapsulate packet 104RM and route packet 101 to destination 125.

The above-described filter-based solution overcomes the storage consumption issue that may be present in the previously-described solution, since less state information is stored in node 120G, which might otherwise store state information for each of the other nodes 120 within network 100. Similarly, other egress nodes may avoid storage of such state information for a similar purpose. However, this filter-based solution might only be able to be implemented for nodes that have the capability to perform such filtering operations.

Although described in the context of a single-SID SRm6 operating in reduced mode, techniques in accordance with the present disclosure may also be applied to other situations. For example, such techniques may be applied to SRv6, and/or applied outside of the SRv6 or SRm6 context, or even outside of the segment routing context. In general, such solutions may be applied in situations in which there may be ambiguity about how to process a packet arriving at an egress node.

Figure 2:
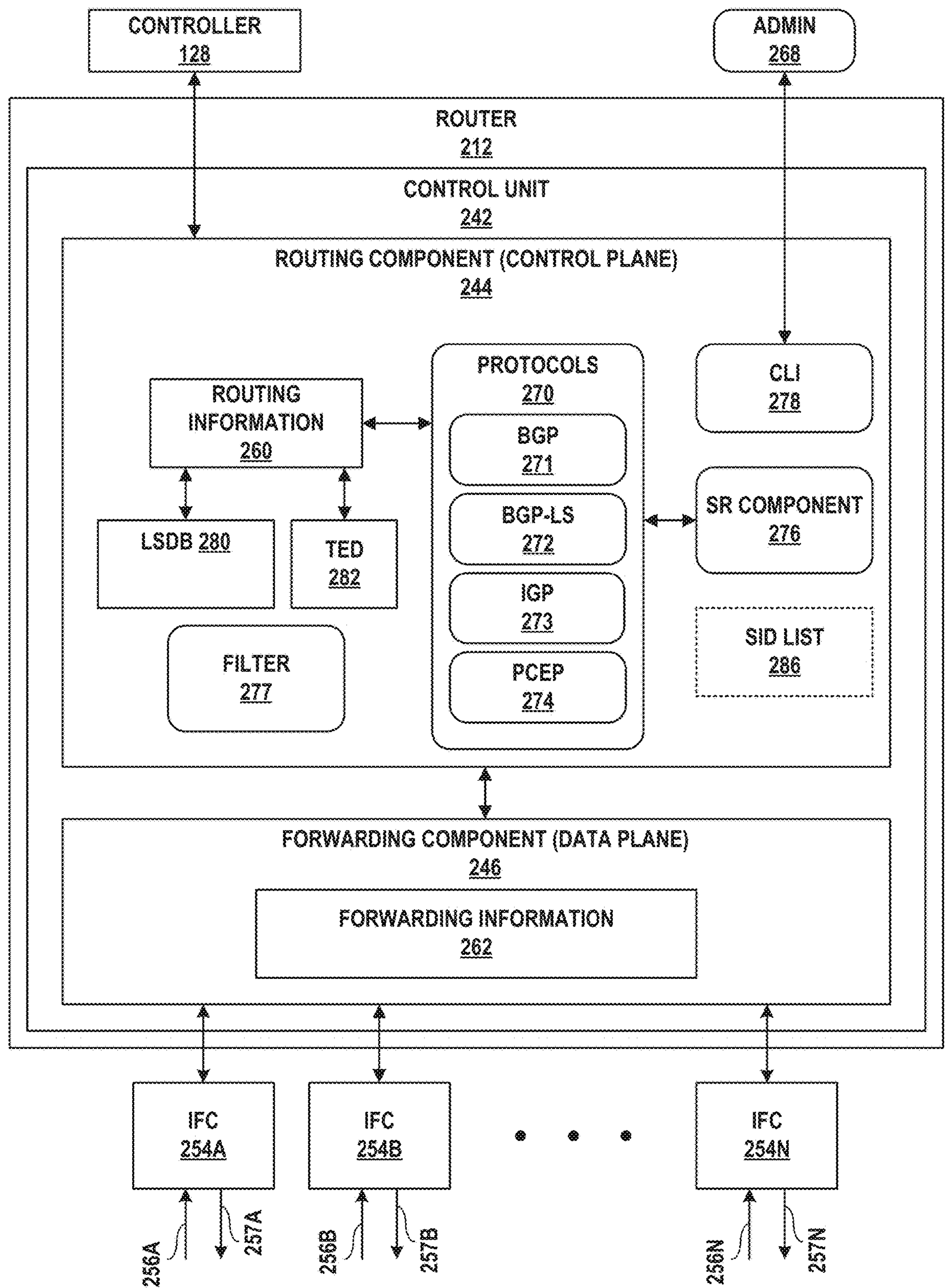
FIG. 2 is a block diagram illustrating an example router capable of operating in accordance with the techniques described herein.

FIG. 2 is a block diagram illustrating an example router 212 capable of operating in accordance with the techniques described herein. Router 212 may represent an example implementation of node 120G of FIG. 1C, or in general, any of nodes 120 of FIG. 1A, FIG. 1B, or FIG. 1C. While described with respect to node or router 212, the techniques described herein may be implemented by any other type of network device capable of implementing segment routing.

In the example of FIG. 2, router 212 includes interface cards 254A-254N ("IFCs 254") that receive and send data units, such as packet flows, via network links 256A-256N and 257A-257N, respectively. Router 212 may include a chassis (not shown) having a number of slots for receiving a set of cards, including IFCs 254. Each card may be inserted into a corresponding slot of the chassis for electrically and/or optically coupling the card to routing component 244 via high-speed switch (not shown), which may comprise, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 212 may interface with links of a network.

In general, router 212 may include a control unit 242 that determines routes of received packets and forwards the packets accordingly via IFCs 254. In the example of FIG. 2, control unit 242 includes routing component (control plane) 244 that configures and controls packet forwarding operations applied by forwarding component (data plane) 246.

Routing component 244 provides an operating environment for various routing protocols 270 that execute at different layers of a network stack. Routing component 244 is responsible for the maintenance of routing information 260 to reflect the current topology of a network and other network entities to which router 212 is connected. In particular, routing protocols periodically update routing information 260 to accurately reflect the topology of the network and other entities based on routing protocol messages received by router 212. The protocols may be software processes executing on one or more processors. For example, routing component 244 includes network protocols that operate at a network layer of the network stack, which are typically implemented as executable software instructions.

In the example of FIG. 2, protocols 270 may include Border Gateway Protocol (BGP) 271 to exchange routing and reachability information among routing domains in a network and BGP-LS 272 to exchange traffic engineering and segment routing policy information among routing domains in the network. Protocols 270 may also include IGP 273 to exchange link state information and facilitate forwarding of packets or other data units between routers within each of the routing domains. In some examples, IGP 273 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 273 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 273 may include IS-IS extensions that support traffic engineering, as described in RFC 5305, by T. Li et al., entitled "IS-IS Extensions for Traffic Engineering," dated October 2008. In some examples, router 212 may include both an OSPF component and an IS-IS component.

Protocols 270 may also include configuration protocols. For example, protocols 270 may include PCEP 274 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples where router 212 comprises an ingress router, controller device 128 (see, e.g., FIG. 1A through 1C and FIG. 2) may configure router 212 with SID list 286 for a segment routing tunnel via PCEP 274 or a NETCONF component (not shown). Protocols 270 may include other routing protocols (not shown), such as Label Distribution Protocol (LDP), Resource Reservation Protocol with Traffic Extensions (RSVP-TE), routing information protocol (RIP), or other network protocols.

Routing component 244 includes a segment routing (SR) module or component 276 to implement segment routing techniques that specify how router 212 may provision and advertise SIDs for adjacency segments, prefix segments, or binding segments. As described in FIG. 1A, FIG. 1B, and FIG. 1C, an ingress router may use the SIDs to steer a packet through a controlled set of instructions, called segments, by encapsulating a network packet with a segment routing header or a compressed routing header, or by encapsulating or prepending the packet with addresses or SIDs in a segment routing header or compressed routing header.

Routing component 244 may also include filter module 277, which includes logic for matching traffic and performing corresponding actions. Filter module 277, which may include or be implemented as one or more firewall filters, may apply filter(s) to traffic in both the input direction (destined for routing engine if applied to the control plane, or ingress traffic to a logical interface if applied to the data plane) and output direction (traffic sourced from the routing engine if applied to the control plane, or egress traffic from a logical interface if applied to the data plane). Such filters may match traffic and perform an action on the traffic matched, in a manner similar to a policy statement. Firewall filters consist of one or more named terms and each term has a set of match conditions, and a set of actions or non-terminating actions. If no traffic is matched by any of the terms, there may be a hidden implicit-rule that discards all traffic. Although filter module 277 is illustrated as located within routing component 244, filter module 277 may be located elsewhere within router 212, including within forwarding component 246.

In the example of FIG. 2, routing engine 244 includes a command line interface (CLI) 278 that provides access for an administrator ("admin") 268 to monitor, configure, or otherwise manage router 212. Admin 268 may instruct router 212 via CLI 278 to configure aspects of router 212, including aspects relating to routing, and provisioning adjacency and/or node SIDs.

By executing the routing protocols, routing component 244 identifies existing routes through the network and determines new routes through the network. Routing component 244 stores routing information 260 that includes, for example, known routes through the network. Forwarding component 246 stores forwarding information 262 that includes destinations of output links 257. Forwarding information 262 may be generated in accordance with routing information 260.

Routing component 244 includes a link state database (LSDB) 280 for storing domain topology information including SIDs and labels for provisioned segments, e.g., adjacency segments, prefix segments, and binding segments, within the routing domain of router 212. The contents of LSDB 280 are maintained in accordance with an IGP 273 and have the scope of a single routing domain. Routing component 244 further includes a Traffic Engineering Database (TED) 282 that augments LSDB 280 with TE link attributes. Each of LSDB 280 and TED 282 may be in the form of a variety of data structures, such as a number of tables, link lists, radix trees, databases, flat files, or other data structures.

In examples where router 212 comprises an ingress router of a segment routing tunnel, routing component 244 may further include a SID list 286 for the segment routing tunnel. Routing component 244 may store SID list 286 for the segment routing tunnel. Based on SID list 286, routing component 244 may create a segment routing label stack for the segment routing tunnel. Upon receipt of packets destined for the egress router of the segment routing tunnel, forwarding component 246 appends the segment routing stack onto the packets and forwards the packets in accordance with the segment routing label stack. Routing component 244 may be responsible for creating segment routing packets, including SRm6 packets and/or SRm6 reduced mode packets.

Although described for purposes of example with respect to a router, router 212 may be more generally a network device having routing functionality, and need not necessarily be a dedicated routing device. The architecture of router 212 illustrated in FIG. 2 is shown as an example. The techniques of this disclosure are not limited to this architecture. In other examples, router 212 may be configured in a variety of ways. In one example, some of the functionally of control unit 242 may be distributed within IFCs 254. In another example, control unit 242 may comprise a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

In FIG. 2, and in accordance with one or more aspects of the present disclosure, administrator 268 may configure router 212 to participate in an SRm6 network. For instance, in an example that can be described with reference to FIG. 2. command line interface 278 of router 212 detects input from administrator 268. Command line interface 278 determines that the input corresponds to information configuring aspects of a network, which may include an SRm6 network in which router 212 participates. Command line interface 278 outputs information to segment routing module 276, which configures router 212 to participate in an SRm6 network.

Segment routing module 276 may configure router 212 to identify packets that arrive at router 212 without a routing header used for segment routing (e.g., a compressed routing header). For instance, continuing with the example being described and with reference to FIG. 2, segment routing module 276 observes advertisements that are received from other nodes 120 (see, e.g., FIG. 1C). Based on such advertisements, segment routing module 276 stores routing information (e.g., a long route) in routing information 260 specifying that SRm6 packets that arrive at router 212 having a specific source and destination address and protocol may be SRm6 packets that are to be de-encapsulated and/or terminated at router 212. When a packet arrives at router 212 matching the stored long route information, router 212 identifies the packet as an SRm6 packet, de-encapsulates the packet, and/or performs a tunnel termination.

In another example, segment routing module 276 may alternatively use the observed advertisements that are received from other nodes 120 to establish a filter at router 212. For instance, again referring to FIG. 2, segment routing module 276 may output information about the observed advertisements to filter module 277. Filter module 277 may establish a filter that triggers certain actions to be performed when a packet matching a specific destination address and protocol is received. After the filter is established, when a packet arrives at router 212, filter module 277 determines whether the specific destination address and protocol matches the address and protocol specified as a condition of the filter. If so, filter module 277 causes specified actions to be performed. In some examples, those actions involve de-encapsulating the packet and performing a tunnel termination.

Modules illustrated herein (e.g., segment routing module 276, filter module 277, and modules 271, 272, 273, and 274) and/or described in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
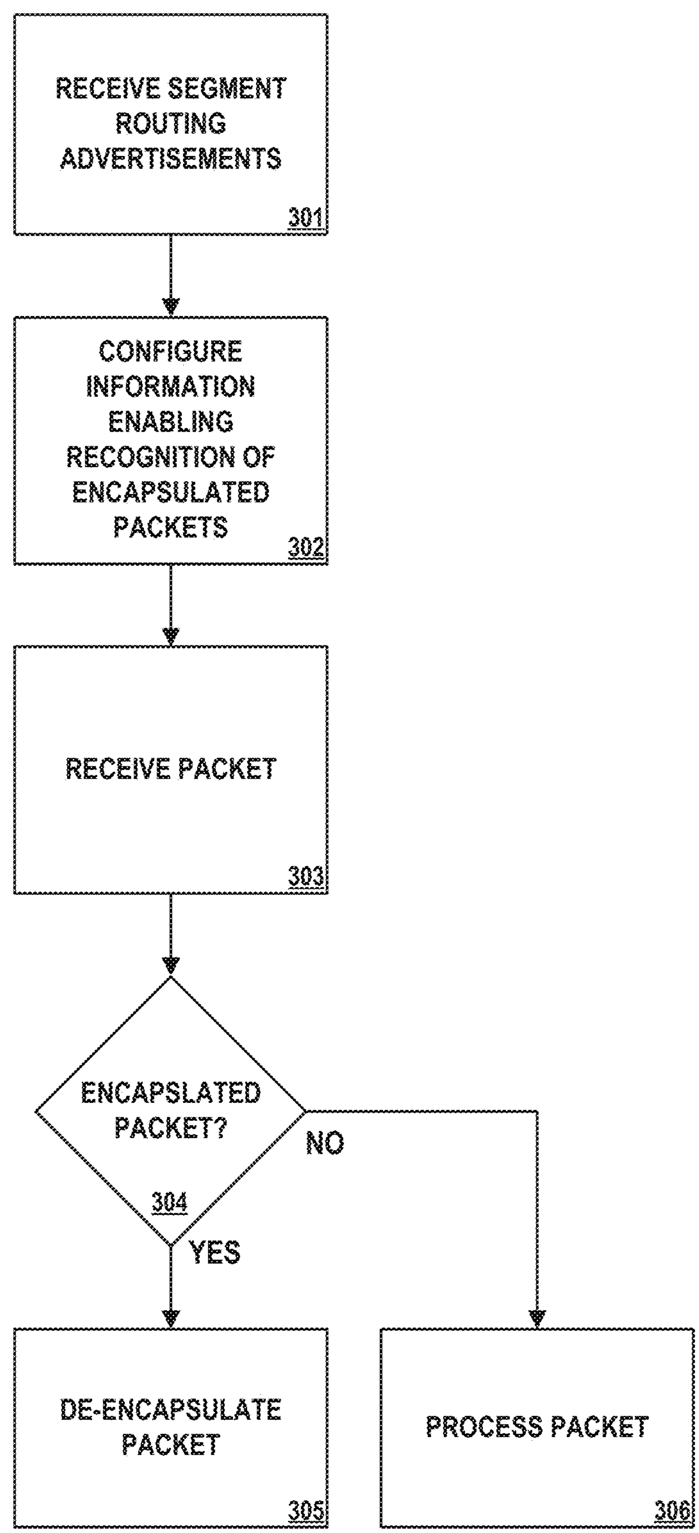
FIG. 3 is a flow diagram illustrating operations performed by an example node in accordance with one or more aspects of the present disclosure.

FIG. 3 is a flow diagram illustrating operations performed by an example node in accordance with one or more aspects of the present disclosure. FIG. 3 is described below within the context of node 120G of FIG. 1C. In other examples, operations described in FIG. 3 may be performed by one or more other components, modules, systems, or devices. Further, in other examples, operations described in connection with FIG. 3 may be merged, performed in a difference sequence, omitted, or may encompass additional operations not specifically illustrated or described.

In the process illustrated in FIG. 3, and in accordance with one or more aspects of the present disclosure, node 120G may receive segment routing advertisements (301). For example, with reference to FIG. 1C, node 120G observes and/or stores information associated with advertisements exchanged by nodes 120 within network 100 that participate in an SRm6 network. Such advertisements may include information about IPv6 addresses of nodes 120 participating in an SRv6 or SRm6 network, or may include information about SIDs used by nodes 120 within network 100.

Node 120G may configure information enabling recognition of encapsulated packets (302). For example, node 120G uses the information about the advertisements exchanged among nodes 120 to determine information about SRm6 routing within network 100. Specifically, node 120G identifies attributes of packets that may arrive at node 120G that node 120G should process as SRm6 packets, even if such packets do not include a compressed routing header (or a routing header used for segment routing). Using the information from the advertisements, node 120G may install one or more long routes specifying a source address, destination address, and protocol associated with such SRm6 packets. In another example, node 120G may configure a filter that triggers performance of actions, as described herein, for packets having a specific destination address and protocol.

Node 120G may receive packet 104 (303). For example, node 120G receives packet 104 over network 100. Node 120G determines that packet 104 does not include compressed routing header 133. In such an example, packet 104 may appear to be simply an IPv6 header, and may have no information, such as segments left field 135, that would otherwise enable node 120G to determine whether packet 104 has reached its destination.

Node 120G may determine whether packet 104 is an encapsulated packet, such as an SRm6 packet that has reached its destination (304). For example, node 120G may determine that packet 104 matches a previously-installed long route, where the long route points to a de-encapsulation next hop. In an example where a filter was configured, node 120G may determine that the destination address and protocol of packet 104 triggers actions to be performed by a filter, where those actions include de-encapsulating packet 104.

Node 120G may de-encapsulate packet 104 (305, YES path from 304). For example, if packet 104 does not include a compressed routing header (or a segment routing header, or possibly, any routing header used for segment routing), but matches a long route or triggers an SRm6 tunnel termination filter, node 120G processes packet 104 as an SRm6 packet at an egress node, and may de-encapsulate packet 104.

Node 120G may otherwise process packet 104 (306, NO path from 304). For example, if node 120G determines that packet 104 does not match any long route and does not trigger actions to be performed by a filter, node 120G processes packet 104 differently, and not as an SRm6 packet (e.g., node 120G may process packet 104 as an IPv6 packet).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of systems and devices (e.g., nodes 120, controllers 128, networks 150, router 212, as well as others) are shown within the illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, or wireless technologies such as infrared, radio, and microwave, then the coaxial cable, fiber optic cable, twisted pair, or wireless technologies such as infrared, radio, and microwave are included in the definition of medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

receiving, by an egress node of a segment routing network, segment routing advertisements, wherein the network includes nodes configured to route packets using segment routing, and wherein the network further includes nodes configured to route packets pursuant to IPv6 without segment routing;

configuring, by the egress node and based on the segment routing advertisements, information enabling the egress node to recognize encapsulated segment routing reduced mode packets arriving at the egress node that do not have a routing header used for segment routing, wherein the segment routing reduced mode packets are encapsulated by an ingress node without a routing header used for segment routing;

receiving, by the egress node, a packet that does not have a routing header used for segment routing;

determining, by the egress node and based on the information, that the egress node is to serve as the egress node for the packet and that the packet is a segment routing packet rather than a packet to be routed pursuant to IPv6 without segment routing; and de-encapsulating, by the egress node and responsive to determining that the egress node is to serve as the egress node for the packet and that the packet is a segment routing packet, the packet.

2. The method of claim 1, wherein the routing header used for segment routing is either a segment routing header or a compressed routing header.

3. The method of claim 2, wherein configuring information enabling the egress node to recognize encapsulated packets arriving at the egress node includes:

configuring a long route specifying a source address, a destination address, and a protocol of an advertised segment based on the segment routing advertisements.

4. The method of claim 3, wherein de-encapsulating the packet includes:

determining that a source address, a destination address, and a protocol of the packet matches the source address, the destination address, and the protocol of the advertised segment.

5. The method of claim 3, wherein the egress node is participating in an SRm6 network with other nodes, and wherein configuring the long route includes:

configuring long routes for advertised segments for each of the other nodes that are neighbors of the egress node and that participate in the SRm6 network.

6. The method of claim 2, wherein configuring information enabling the egress node to recognize encapsulated packets arriving at the egress node includes:

configuring a filter to perform actions based on a destination address and a protocol of an advertised segment derived from the segment routing advertisements.

7. The method of claim 6, wherein de-encapsulating the packet includes:

responsive to determining that the filter matches a destination address and a protocol of the packet, applying the actions to the packet.

8. The method of claim 6, wherein the actions include:

performing a tunnel termination.

9. The method of claim 2, wherein the segment routing network is a network that includes SRm6-aware nodes.

10. The method of claim 9, wherein the segment routing network operates in SRm6 reduced mode, and processes SRm6 packets having only a single SID.

11. The method of claim 10, wherein the SRm6 packets having only a single SID are encapsulated without a compressed routing header.

12. The method of claim 1, wherein determining that the egress node is to serve as the egress node for the packet and that the packet is a segment routing packet includes:

determining that the packet does not include a compressed routing header.

13. The method of claim 1, wherein determining that the egress node is to serve as the egress node for the packet and that the packet is a segment routing packet includes:

determining that the packet does not include either a segment routing header or a compressed routing header.

14. The method of claim 1, wherein determining that the egress node is to serve as the egress node for the packet and that the packet is a segment routing packet includes:

determining that the packet does not include a routing header used for segment routing.

15. The method of claim 1, wherein receiving a packet that does not have a routing header includes:

receiving a packet that does not include a segments left field.

16. A system comprising:

a storage device; and processing circuitry in a node within a segment routing network, wherein the network includes nodes configured to route packets using segment routing, wherein the network further includes nodes configured to route packets pursuant to IPv6 without segment routing, and wherein the processing circuitry has access to the storage device and is configured to:

receive segment routing advertisements, configure, based on the segment routing advertisements, information enabling the node to recognize encapsulated segment routing reduced mode packets arriving at the node that do not have a routing header used for segment routing, wherein the segment routing reduced mode packets are encapsulated by an ingress node without a routing header used for segment routing, receive a packet that does not have a routing header used for segment routing, determine, based on the information, that the node is to serve as an egress node for the packet, and that the packet is a segment routing packet rather than a packet to be routed pursuant to IPv6 without segment routing, and de-encapsulate, responsive to determining that the node is to serve as the egress node for the packet and that the packet is a segment routing packet, the packet.

17. The system of claim 16, wherein the routing header used for segment routing is either a segment routing header or a compressed routing header.

18. The system of claim 17, wherein to configure information enabling the node to recognize encapsulated packets arriving at the node, the processing circuitry is further configured to:

configure a long route specifying a source address, a destination address, and a protocol of an advertised segment based on the segment routing advertisements.

19. The system of claim 18, wherein to de-encapsulate the packet, the processing circuitry is further configured to:

determine that a source address, a destination address, and a protocol of the packet matches the source address, the destination address, and the protocol of the advertised segment.

20. A non-transitory computer-readable storage medium comprising instructions that, when executed, configure processing circuitry to:

receive segment routing advertisements over a network that includes both nodes configured to route packets using segment routing and nodes configured to route packets pursuant to IPv6 without segment routing;

configure, based on the segment routing advertisements, information enabling a node to recognize encapsulated segment routing reduced mode packets arriving at the node that do not have a routing header used for segment routing, wherein the segment routing reduced mode packets are encapsulated by an ingress node without a routing header used for segment routing;

receive a packet that does not have a routing header used for segment routing;

determine, based on the information, that the node is to serve as an egress node for the packet and that the packet is a segment routing packet rather than a packet to be routed pursuant to IPv6 without segment routing, and de-encapsulate, responsive to determining that the node is to serve as the egress node for the packet and that the packet is a segment routing packet, the packet.

* * * * *